United States Patent
Faitelson et al.

(10) Patent No.: US 11,151,515 B2
(45) Date of Patent: Oct. 19, 2021

(54) EMAIL DISTRIBUTION LIST MEMBERSHIP GOVERNANCE METHOD AND SYSTEM

(75) Inventors: Yakov Faitelson, Elkana (IL); Ohad Korkus, Herzeliya (IL); Ophir Kretzer-Katzir, Reut (IL); David Bass, Karmei Yoseph (IL)

(73) Assignee: VARONIS SYSTEMS, INC.

( * ) Notice: Subject to any disclaimer, the term of this patent is extended or adjusted under 35 U.S.C. 154(b) by 46 days.

(21) Appl. No.: 13/562,711

(22) Filed: Jul. 31, 2012

(65) Prior Publication Data

US 2014/0040384 A1   Feb. 6, 2014

(51) Int. Cl.
*G06Q 10/10*   (2012.01)

(52) U.S. Cl.
CPC .................... *G06Q 10/107* (2013.01)

(58) Field of Classification Search
CPC ...... G06F 7/00; G06F 15/173; G06F 21/6218; G06Q 10/107; G06Q 10/06; G06Q 10/06311; H04L 29/06; H04L 41/00; H04L 12/185
USPC .............................................. 709/206; 707/9
See application file for complete search history.

(56) References Cited

U.S. PATENT DOCUMENTS

| | | | |
|---|---|---|---|
| 5,092,909 A * | 3/1992 | Werner | C10L 9/00 435/262 |
| 5,465,387 A | 11/1995 | Mukherjee | |
| 5,899,991 A | 5/1999 | Karch | |
| 6,338,082 B1 | 1/2002 | Schneider | |
| 6,393,468 B1 | 5/2002 | McGee | |
| 6,557,036 B1 * | 4/2003 | Kavacheri | G06F 11/3414 709/206 |
| 6,704,772 B1 * | 3/2004 | Ahmed | G06Q 10/107 709/206 |
| 6,769,002 B2 * | 7/2004 | Ayan | G06Q 30/02 |
| 6,928,439 B2 | 8/2005 | Satoh | |
| 7,031,984 B2 | 4/2006 | Kawamura et al. | |
| 7,068,592 B1 | 6/2006 | Duvaut et al. | |
| 7,117,370 B2 | 10/2006 | Khan et al. | |

(Continued)

FOREIGN PATENT DOCUMENTS

| | | |
|---|---|---|
| CN | 1819563 | 8/2006 |
| CN | 101529412 | 9/2009 |

(Continued)

OTHER PUBLICATIONS

Klensin, "Simple Mail Transfer Protocol", 2001.*

(Continued)

*Primary Examiner* — Ondrej C Vostal (57) ABSTRACT

A computer-implemented method for controlling email distribution list membership in an enterprise email system, including the steps of monitoring and collecting continuously updated information regarding access to email distribution lists of an email system by members of the email distribution lists, ascertaining that a particular member of at least one of the email distribution lists has not accessed the at least one of the email distribution lists for a predetermined period of time, and responsive to the ascertaining, at least one of recommending revoking membership of the particular member to the at least one of the email distribution lists and automatically revoking membership of the particular member to the at least one of the email distribution lists.

20 Claims, 11 Drawing Sheets

(56) References Cited

U.S. PATENT DOCUMENTS

| | | | |
|---|---|---|---|
| 7,162,738 B2 | 1/2007 | Dickinson, III et al. | |
| 7,213,019 B1* | 5/2007 | Noris et al. | |
| 7,278,065 B2* | 10/2007 | Conkel | G06F 11/0709 |
| | | | 707/E17.005 |
| 7,403,925 B2 | 7/2008 | Schlesinger et al. | |
| 7,421,740 B2 | 9/2008 | Fey et al. | |
| 7,555,482 B2 | 6/2009 | Korkus | |
| 7,590,705 B2* | 9/2009 | Mathew | G06Q 30/02 |
| | | | 709/217 |
| 7,606,801 B2 | 10/2009 | Faitelson et al. | |
| 7,617,328 B2* | 11/2009 | Lewis | H04L 12/2856 |
| | | | 709/206 |
| 7,644,144 B1* | 1/2010 | Horvitz | G06Q 10/10 |
| | | | 709/203 |
| 7,734,696 B2* | 6/2010 | Osterberg, Jr. | H04L 51/00 |
| | | | 709/206 |
| 7,895,282 B1* | 2/2011 | Wang | G06F 16/10 |
| | | | 709/206 |
| 8,068,588 B2 | 11/2011 | Ramanathan et al. | |
| 8,234,374 B2* | 7/2012 | Marcjan | G06F 21/6218 |
| | | | 709/205 |
| 8,239,414 B2* | 8/2012 | Liao | G06F 16/2228 |
| | | | 707/791 |
| 8,280,913 B2* | 10/2012 | Bergin | 707/793 |
| 8,433,712 B2* | 4/2013 | Koide | G06F 16/90335 |
| | | | 707/748 |
| 8,510,472 B1* | 8/2013 | Anderson | G06Q 10/107 |
| | | | 709/245 |
| 8,578,507 B2* | 11/2013 | Faitelson | G06F 21/604 |
| | | | 726/28 |
| 8,666,759 B2* | 3/2014 | Eckert et al. | 705/2 |
| 8,739,249 B1* | 5/2014 | Kay | H04L 63/08 |
| | | | 726/3 |
| 8,819,009 B2* | 8/2014 | Wana | G06F 16/958 |
| | | | 707/734 |
| 8,819,120 B1* | 8/2014 | Wang | G06Q 10/10 |
| | | | 709/203 |
| 9,106,687 B1* | 8/2015 | Sawhney | H04L 12/185 |
| 9,177,293 B1* | 11/2015 | Gagnon | G06Q 10/107 |
| 9,361,464 B2* | 6/2016 | Wu | G06F 21/60 |
| 10,445,382 B2* | 10/2019 | Hyatt | G06F 16/24575 |
| 10,445,520 B2* | 10/2019 | Ciancio-Bunch | G06F 21/6218 |
| 10,785,370 B1* | 9/2020 | Koster | H04M 3/5158 |
| 2002/0078052 A1* | 6/2002 | Cheng | H04L 51/30 |
| 2002/0178229 A1* | 11/2002 | Sinha | G06Q 10/10 |
| | | | 709/206 |
| 2002/0184323 A1* | 12/2002 | Hamlin | H04L 12/58 |
| | | | 709/206 |
| 2002/0194351 A1* | 12/2002 | Nishimura | H04L 29/06 |
| | | | 709/229 |
| 2003/0048301 A1 | 3/2003 | Menninger | |
| 2003/0051026 A1 | 3/2003 | Carter et al. | |
| 2003/0126137 A1* | 7/2003 | McFadden | G06F 16/288 |
| 2003/0131232 A1* | 7/2003 | Fraser | H04L 63/0823 |
| | | | 713/156 |
| 2003/0182056 A1* | 9/2003 | Nozaki et al. | 701/209 |
| 2003/0231207 A1 | 12/2003 | Huang | |
| 2004/0050986 A1* | 3/2004 | Rossi, Jr. | B02C 1/10 |
| | | | 241/101.73 |
| 2004/0064512 A1* | 4/2004 | Arora | H04L 51/04 |
| | | | 709/206 |
| 2004/0128186 A1* | 7/2004 | Breslin et al. | 705/10 |
| 2004/0193691 A1* | 9/2004 | Chang | G06Q 10/107 |
| | | | 709/206 |
| 2004/0249847 A1 | 12/2004 | Wang et al. | |
| 2005/0010645 A1* | 1/2005 | Arshi et al. | 709/207 |
| 2005/0015362 A1* | 1/2005 | Ostertag | G06Q 10/06311 |
| 2005/0027803 A1* | 2/2005 | Kelley | G06Q 10/107 |
| | | | 709/206 |
| 2005/0066166 A1* | 3/2005 | Chin | H04L 12/66 |
| | | | 713/165 |
| 2005/0086529 A1 | 4/2005 | Buchsbaum | |
| 2005/0102154 A1* | 5/2005 | Dodd | G06Q 10/087 |
| | | | 705/7.32 |
| 2005/0108206 A1 | 5/2005 | Lam et al. | |
| 2005/0120054 A1 | 6/2005 | Shulman et al. | |
| 2005/0144279 A1* | 6/2005 | Wexelblat | 709/225 |
| 2005/0198237 A1* | 9/2005 | Oliver | H04L 12/1822 |
| | | | 709/222 |
| 2005/0203881 A1 | 9/2005 | Sakamoto et al. | |
| 2005/0223057 A1* | 10/2005 | Buchheit | G06F 16/24 |
| | | | 709/203 |
| 2005/0251675 A1 | 11/2005 | Marcjan et al. | |
| 2006/0041505 A1* | 2/2006 | Enyart | 705/40 |
| 2006/0064313 A1 | 3/2006 | Steinbarth et al. | |
| 2006/0143278 A1* | 6/2006 | Bauchot | G06Q 10/107 |
| | | | 709/206 |
| 2006/0168008 A1 | 7/2006 | Chen | |
| 2006/0184459 A1 | 8/2006 | Parida | |
| 2006/0184530 A1 | 8/2006 | Song et al. | |
| 2006/0195892 A1* | 8/2006 | Inage | 726/5 |
| 2007/0061423 A1 | 3/2007 | Accapadi et al. | |
| 2007/0061487 A1 | 3/2007 | Moore et al. | |
| 2007/0100999 A1* | 5/2007 | Haider | G06Q 10/107 |
| | | | 709/225 |
| 2007/0150299 A1* | 6/2007 | Flory | G06Q 10/10 |
| | | | 705/51 |
| 2007/0192421 A1* | 8/2007 | Iwai | 709/206 |
| 2007/0203872 A1 | 8/2007 | Flinn et al. | |
| 2007/0244899 A1* | 10/2007 | Faitelson | G06F 21/6218 |
| 2007/0266006 A1* | 11/2007 | Buss | G06F 21/6218 |
| 2008/0034042 A1* | 2/2008 | Costea | H04L 51/12 |
| | | | 709/206 |
| 2008/0065974 A1* | 3/2008 | Campbell | G06F 17/248 |
| | | | 715/200 |
| 2008/0071867 A1* | 3/2008 | Pearson | G06Q 10/107 |
| | | | 709/206 |
| 2008/0097998 A1* | 4/2008 | Herbach | 707/9 |
| 2008/0109448 A1* | 5/2008 | Aboel-Nil | G06Q 10/107 |
| 2008/0114847 A1* | 5/2008 | Ma | G06Q 50/184 |
| | | | 709/206 |
| 2008/0172720 A1 | 7/2008 | Botz et al. | |
| 2008/0177845 A1* | 7/2008 | Bracewell | H04L 51/22 |
| | | | 709/206 |
| 2008/0243933 A1* | 10/2008 | Holtzman | G06Q 10/10 |
| 2008/0256458 A1* | 10/2008 | Aldred | G06F 21/6218 |
| | | | 715/741 |
| 2008/0271157 A1 | 10/2008 | Faitelson et al. | |
| 2009/0013375 A1* | 1/2009 | MacIntosh | H04L 63/168 |
| | | | 726/1 |
| 2009/0029676 A1* | 1/2009 | Thalapaneni | H04L 61/1594 |
| | | | 455/411 |
| 2009/0037568 A1* | 2/2009 | Bouat et al. | 709/223 |
| 2009/0100058 A1 | 4/2009 | Faitelson et al. | |
| 2009/0100529 A1* | 4/2009 | Livnat et al. | 726/28 |
| 2009/0113446 A1* | 4/2009 | Hamilton | G06Q 10/107 |
| | | | 719/314 |
| 2009/0119115 A1* | 5/2009 | Shaffer | G06Q 30/0281 |
| | | | 705/346 |
| 2009/0119190 A1* | 5/2009 | Realini | 705/30 |
| 2009/0119298 A1 | 5/2009 | Faitelson et al. | |
| 2009/0138792 A1* | 5/2009 | Cudich et al. | 715/234 |
| 2009/0150981 A1 | 6/2009 | Amies et al. | |
| 2009/0177747 A1* | 7/2009 | Agrawal et al. | 709/206 |
| 2009/0177754 A1* | 7/2009 | Brezina et al. | 709/206 |
| 2009/0228555 A1 | 9/2009 | Joviak et al. | |
| 2009/0265429 A1* | 10/2009 | Gestsson et al. | 709/204 |
| 2009/0265780 A1 | 10/2009 | Korkus et al. | |
| 2009/0319624 A1* | 12/2009 | Buschi et al. | 709/206 |
| 2010/0312836 A1* | 12/2010 | Serr et al. | 709/206 |
| 2010/0324963 A1* | 12/2010 | Gupta et al. | 705/9 |
| 2011/0010758 A1 | 1/2011 | Faitelson et al. | |
| 2011/0055330 A1* | 3/2011 | Buck et al. | 709/206 |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0119230 A1* | 5/2011 | Zuber | G06Q 10/10 |
| | | | 707/608 |
| 2011/0145334 A9* | 6/2011 | Colson | G06Q 10/06 |
| | | | 709/206 |

(56) References Cited

U.S. PATENT DOCUMENTS

| | | | |
|---|---|---|---|
| 2011/0184989 A1 | 7/2011 | Faitelson et al. | |
| 2011/0289433 A1* | 11/2011 | Whalin | G06F 17/30964 715/753 |
| 2011/0296490 A1 | 12/2011 | Faitelson et al. | |
| 2011/0307562 A1* | 12/2011 | Chakra et al. | 709/206 |
| 2012/0041929 A1* | 2/2012 | Kapoor | G06F 17/30073 707/661 |
| 2012/0054283 A1* | 3/2012 | Korkus et al. | 709/206 |
| 2012/0150888 A1* | 6/2012 | Hyatt | G06F 21/6254 707/758 |
| 2012/0179981 A1* | 7/2012 | Whalin | G06Q 10/10 715/753 |
| 2012/0221370 A1* | 8/2012 | Ostertag et al. | 705/7.23 |
| 2012/0221550 A1 | 8/2012 | Korkus et al. | |
| 2012/0271853 A1 | 10/2012 | Faitelson et al. | |
| 2012/0271855 A1 | 10/2012 | Faitelson et al. | |
| 2012/0291100 A1 | 11/2012 | Faitelson et al. | |
| 2013/0159426 A1* | 6/2013 | Milic-Frayling | H04L 51/32 709/206 |
| 2013/0290416 A1* | 10/2013 | Nelson et al. | 709/204 |
| 2016/0034588 A1* | 2/2016 | Hyatt | G06F 16/288 707/733 |
| 2018/0077542 A1* | 3/2018 | Xie | H04W 4/12 |
| 2018/0131647 A1* | 5/2018 | Nagesha | H04L 51/04 |
| 2020/0042736 A1* | 2/2020 | Ciancio-Bunch | G06F 21/6218 |

FOREIGN PATENT DOCUMENTS

| | | | |
|---|---|---|---|
| EP | 1563427 A2 * | 8/2005 | |
| EP | 1470681 B1 * | 4/2006 | |
| EP | 1796019 | 6/2007 | |
| EP | 2171916 A2 * | 4/2010 | |
| JP | 2014211880 A * | 11/2014 | G06Q 30/02 |
| JP | 5824552 B2 * | 11/2015 | G06Q 10/107 |
| JP | 6111394 B2 * | 4/2017 | G06Q 30/02 |
| WO | WO 2004114092 A2 * | 12/2004 | |
| WO | WO 2006046439 A1 * | 5/2006 | |
| WO | WO 2006104706 A2 * | 10/2006 | |
| WO | WO 2007101149 A2 * | 9/2007 | |
| WO | WO 2008016396 A2 * | 2/2008 | |
| WO | WO-2013089823 A1 * | 6/2013 | G06F 21/6254 |
| WO | WO-2015164521 A1 * | 10/2015 | H04L 63/101 |
| WO | WO-2016149338 A1 * | 9/2016 | G06Q 50/01 |

OTHER PUBLICATIONS

Merriam-Webster online dictionary, "Membership", 2014.*
Merriam-Webster, "controlling", 2015.*
Merriam-Webster, "permission", 2015.*
Rose, "A Practice for Revoking Posting Rights to IETF Mailing Lists", 2004.*
Merriam-Webster, "correspond", 2015.*
Merriam-Webster, "correspondence", 2015.*
Merriam-Webster, "revoke", 2015.*
Merriam-Webster, "revoke", 2016.*
Merriam-Webster, "access", 2015.*
Merriam-Webster, "membership", 2015.*
Wikipedia, "Distribution list", 2015.*
Beal, "email server", 2017.*
Larramo, "What is a Mail Server and How Does it Work?", 2017.*
Merriam-Webster, "controlling", 2016.*
Merriam-Webster, "ascertain", 2017.*
Merriam-Webster, "thereby", 2017.*
Microsoft, "Distribution Lists", 2008.*
Wikipedia, "distribution list", 2014.*
Rouse, "mail server", 2001-2017.*
Desmond et al., "Active Directory", 2009.*
Federal Circuit, "*Amdocs (Israel) Limited* v. *Openet Telecom, Incorporated*", No. 1:10-cv-00910-LMB-TRJ, 2016.*
Webopedia, "email server", 2020 (Year: 2020).*
Kadowaki et al., "Collaborative Admission Control Scheme for Group-Based P2P Contents Sharing Systems", 2012 (Year: 2012).*
Rams et al., "A Survey of Group Key Distribution Schemes With Self-Healing Property", 2013.*
Rose, "A Practice for Revoking Posting Rights to IETF Mailing Lists", RFC 3683, 2004 (Year: 2004).*
Sun et al., "Network-Aware Security for Group Communications", 2008 (Year: 2008).*
Umaparvathi et al., "A Survey on Key Managemenet System for Mobile Ad-Hoc Networks", 2009 (Year: 2009).*
Merriam-Webster, "membership", 2020 (Year: 2020).*
Microsoft, "Distribution Lists", 2007 (Year: 2007).*
Rouse, "mail server", 2017 (Year: 2017).*
Wikipedia, "distribution list", 2020 (Year: 2020).*
USPTO NFOA dated Apr. 18, 2012 in connection with U.S. Appl. No. 12/861,953.
USPTO NFOA dated Sep. 14, 2012 in connection with U.S. Appl. No. 12/861,967.
International Search Report and Written Opinion dated Nov. 8, 2013; PCT/IL13/50614.
European Search Report dated Mar. 3, 2016 which issued during the prosecution of Applicant's European App No. 13825599.
U.S. Appl. No. 11/635,736, filed Dec. 7, 2006 issued as U.S. Pat. No. 7,555,482.
U.S. Appl. No. 11/258,256, filed Oct. 25, 2005 issued as U.S. Pat. No. 7,606,801.
U.S. Appl. No. 11/786,522, filed Apr. 12, 2007 published as 2007/0244899.
U.S. Appl. No. 11/789,884, filed Apr. 26, 2007 published as 2008/0271157.
U.S. Appl. No. 11/871,028, filed Oct. 11, 2007 published as 2009/0100058.
U.S. Appl. No. 11/935,742, filed Nov. 6, 2007 published as 2009/0119298.
U.S. Appl. No. 12/106,466, filed Apr. 21, 2008 published as 2009/0265780.
U.S. Appl. No. 12/498,675, filed Jul. 7, 2009 published as 2011/0010758.
U.S. Appl. No. 12/772,450, filed May 3, 2010 published as 2011/0060916.
U.S. Appl. No. 12/861,967, filed Aug. 24, 2010 published as 2011/0061093.
U.S. Appl. No. 12/814,807, filed Jun. 14, 2010 published as 2011/0061111.
U.S. Appl. No. 13/014,762, filed Jan. 27, 2011 published as 2011/0184989.
U.S. Appl. No. 12/861,059, filed Aug. 23, 2010 published as 2011/0296490.
U.S. Appl. No. 12/861,953, filed Aug. 24, 2010 published as 2012/0054283.
U.S. Appl. No. 13/106,023, filed May 12, 2011 published as 2012/0291100.
U.S. Appl. No. 13/159,903, filed Jun. 14, 2011 published as 2012/0271853.
U.S. Appl. No. 13/303,826, filed Nov. 23, 2011 published as 2012/0271855.

* cited by examiner

EMAIL DISTRIBUTION LIST MEMBERSHIP GOVERNANCE METHOD AND SYSTEM

REFERENCE TO RELATED APPLICATIONS

Reference is made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0010758; 2011/0060916; 2011/0061093, 2011/0061111, 2011/0184989, 2011/0296490 and 2012/0054283; and U.S. patent application Ser. Nos. 13/106,023; 13/159,903; and 13/303,826.

FIELD OF THE INVENTION

The present invention relates generally to email distribution list membership governance systems and methods.

BACKGROUND OF THE INVENTION

U.S. Pat. Nos. 5,465,387; 5,899,991; 6,338,082; 6,393,468; 6,928,439; 7,031,984; 7,068,592; 7,403,925; 7,421,740; 7,555,482 and 7,606,801; and U.S. Published Patent Application Nos. 2003/0051026; 2004/0249847; 2005/0108206; 2005/0203881; 2005/0120054; 2005/0086529; 2006/0064313; 2006/0184530; 2006/0184459 and 2007/0203872.

SUMMARY OF THE INVENTION

The present invention seeks to provide email distribution list membership governance systems and methods.

There is thus provided in accordance with a preferred embodiment of the present invention a computer-implemented method for controlling email distribution list membership in an enterprise email system, including the steps of monitoring and collecting continuously updated information regarding access to email distribution lists of an email system by members of the email distribution lists, ascertaining that a particular member of at least one of the email distribution lists has not accessed the at least one of the email distribution lists for a predetermined period of time, and responsive to the ascertaining, at least one of recommending revoking membership of the particular member to the at least one of the email distribution lists and automatically revoking membership of the particular member to the at least one of the email distribution lists.

Preferably, the access to email distribution lists includes replying to an email received via the at least one of the distribution lists, to the at least one of the distribution lists. Additionally or alternatively, the access to email distribution lists includes sending an email to the at least one of the distribution lists. Additionally or alternatively, the access to email distribution lists includes replying to an email received via the at least one of the distribution lists, to at least one member of the at least one of the distribution lists. Additionally or alternatively, the access to email distribution lists includes replying to an email received from at least one member of the at least one of the distribution lists, to the at least one member. Additionally or alternatively, the access to email distribution lists includes sending an email to at least one member of the at least one of the distribution lists.

There is also provided in accordance with another preferred embodiment of the present invention a computer-implemented method for controlling email distribution list membership in an enterprise email system, including the steps of monitoring and collecting continuously updated information regarding access to email distribution lists of an email system by users of the email system, ascertaining that a particular user of the email system has regularly accessed at least one of the email distribution lists during a predetermined period of time, and responsive to the ascertaining, at least one of recommending granting membership to the particular user to the at least one of the email distribution lists and automatically granting membership to the particular user to the at least one of the email distribution lists.

Preferably, the access to email distribution lists includes sending an email to the at least one of the distribution lists. Additionally or alternatively, the access to email distribution lists includes replying to an email received via the at least one of the distribution lists, to at least one member of the at least one of the distribution lists. Additionally or alternatively, the access to email distribution lists includes sending an email to at least one member of the at least one of the distribution lists.

There is further provided in accordance with yet another preferred embodiment of the present invention an email distribution list membership governance system for controlling email distribution list membership in an enterprise email system, the system including an email monitoring subsystem operable for monitoring and collecting continuously updated information regarding access to email distribution lists of an email system by members of the email distribution lists, and an email distribution list membership recommendation subsystem operable for ascertaining that a particular member of at least one of the email distribution lists has not accessed the at least one of the email distribution lists for a predetermined period of time, and for recommending, responsive to the ascertaining, revoking membership of the particular member to the at least one of the email distribution lists.

Preferably, the access to email distribution lists includes replying to an email received from the at least one of the distribution lists, to the at least one of the distribution lists. Additionally or alternatively, the access to email distribution lists includes sending an email to the at least one of the distribution lists. Additionally or alternatively, the access to email distribution lists includes replying to an email received from the at least one of the distribution lists, to at least one member of the at least one of the distribution lists. Additionally or alternatively, the access to email distribution lists includes replying to an email received from at least one member of the at least one of the distribution lists, to the at least one member. Additionally or alternatively, the access to email distribution lists includes sending an email to at least one member of the at least one of the distribution lists.

There is yet further provided in accordance with still another preferred embodiment of the present invention an email distribution list membership governance system for controlling email distribution list membership in an enterprise email system, the system including an email monitoring subsystem operable for monitoring and collecting continuously updated information regarding access to email distribution lists of an email system, by users of the email system, and an email distribution list membership recommendation subsystem operable for ascertaining that a particular user of the email system has regularly accessed at least one of the email distribution lists during a predetermined period of time and for recommending, responsive to the ascertaining, granting membership to the particular user to the at least one of the email distribution lists.

Preferably, the access to email distribution lists includes sending an email to the at least one of the distribution lists. Additionally or alternatively, the access to email distribution lists includes replying to an email received from the at least one of the distribution lists, to at least one member of the at least one of the distribution lists. Additionally or alternatively, the access to email distribution lists includes sending an email to at least one member of the at least one of the distribution lists.

There is also provided in accordance with another preferred embodiment of the present invention an email distribution list membership governance system for controlling email distribution list membership in an enterprise email system, the system including an email monitoring subsystem operable for monitoring and collecting continuously updated information regarding access to email distribution lists of an email system by members of email distribution lists of an email system and an email distribution list membership management subsystem operable for ascertaining that a particular member of at least one of the email distribution lists has not accessed the at least one of the email distribution lists for a predetermined period of time, and, responsive to the ascertaining, for automatically revoking membership of the particular member to the at least one of the email distribution lists.

Preferably, the access to email distribution lists includes replying to an email received from the at least one of the distribution lists, to the at least one of the distribution lists. Additionally or alternatively, the access to email distribution lists includes sending an email to the at least one of the distribution lists. Additionally or alternatively, the access to email distribution lists includes replying to an email received from the at least one of the distribution lists, to at least one member of the at least one of the distribution lists. Additionally or alternatively, the access to email distribution lists includes replying to an email received from at least one member of the at least one of the distribution lists, to the at least one member. Additionally or alternatively, the access to email distribution lists includes sending an email to at least one member of the at least one of the distribution lists.

There is further provided in accordance with yet another preferred embodiment of the present invention an email distribution list membership governance system for controlling email distribution list membership in an enterprise email system, the system including an email monitoring subsystem operable for monitoring and collecting continuously updated information regarding access to email distribution lists of an email system, by users of the email system and an email distribution list membership management subsystem operable for ascertaining that a particular user of the email system has regularly accessed at least one of the email distribution lists during a predetermined period of time and, responsive to the ascertaining, for automatically granting membership to the particular user to the at least one of the email distribution lists.

Preferably, the access includes sending an email to the at least one of the distribution lists. Additionally or alternatively, the access to email distribution lists to email distribution lists includes replying to an email received from the at least one of the distribution lists, to at least one member of the at least one of the distribution lists. Additionally or alternatively, the access to email distribution lists includes sending an email to at least one member of the at least one of the distribution lists.

BRIEF DESCRIPTION OF THE DRAWINGS

The present invention will be understood and appreciated more fully from the following detailed description taken in conjunction with the drawing in which.

DETAILED DESCRIPTION OF PREFERRED EMBODIMENTS

Reference is now made to FIGS. 1A, 1B, 1C, 1D and 1E, which are simplified pictorial illustrations of examples of steps in the operation of a computer-implemented method for controlling email distribution list membership in an enterprise email system, constructed and operative in accordance with a preferred embodiment of the present invention. The method illustrated in FIGS. 1A-1E preferably includes monitoring and collecting continuously updated information regarding access to email distribution lists of an email system by members of the email distribution lists.

For the purposes of this application, the term "access to an email distribution list" is defined as email correspondence with at least a portion of the members of a distribution list, and may include, for example, any of the following:

receiving emails via the distribution list;

replying to emails received via the distribution list, to the distribution list;

sending emails to the distribution list;

replying to emails received via the distribution list, to particular members of the distribution list;

replying to emails received from particular members of the distribution list, to the particular members of the distribution list; and sending emails to particular members of the distribution list.

Preferably, the method also includes ascertaining that a particular member of at least one of the email distribution lists has not accessed the email distribution list for a predetermined period of time, and, responsive to the ascertaining, at least one of recommending revoking membership of the particular member to the email distribution list and automatically revoking membership of the particular member to the email distribution list.

The method illustrated in FIGS. 1A-1E is preferably implemented by a system which resides on a server 100 connected to an enterprise-wide computer network 102 having disparate servers 104 and computer 106 connected thereto. Network 102 preferably also comprises at least one email server 110. The system of server 100 preferably continuously monitors and collects updated information regarding access, by members of email distribution lists hosted by email server 110, to the email distribution lists.

Figure 1A:
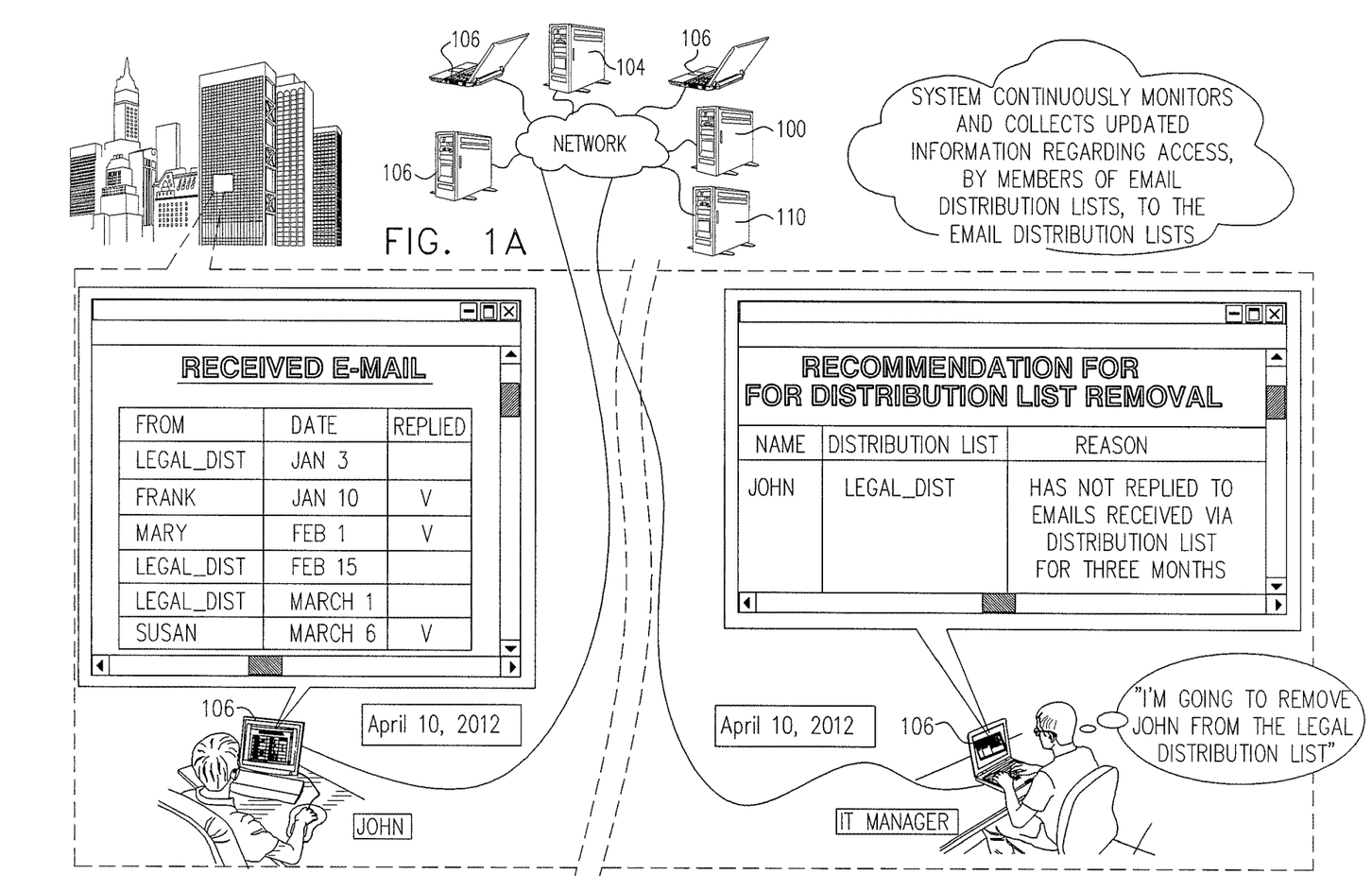
FIGS. 1A, 1B, 1C, 1D and 1E are simplified pictorial illustrations of examples of steps in the operation of a computer-implemented method for controlling email distribution list membership in an enterprise email system, operative in accordance with a preferred embodiment of the present invention.

As shown in particular in FIG. 1A, John, a user of email server 110, periodically receives emails via an email distribution list associated with the legal department of a company served by email server 110. On a particular date, such as Apr. 10, 2012, it is shown that John has not replied to emails received via the legal department distribution list for at least the last three months.

As further shown in FIG. 1A, an IT Manager utilizing the system of server 100, receives a recommendation from server 100 stating that John has not replied to emails received via the legal distribution list for at least the last three months, and that therefore, due to John's lack of access to the distribution list, John's membership to the legal distribution list should be revoked. It is appreciated that refraining to reply to a distribution list by a member of the distribution list is characteristic of a member for whom the content distributed on the distribution list is no longer relevant.

Alternatively, the system of server 100 may automatically revoke John's membership to the legal distribution list.

Figure 1B:
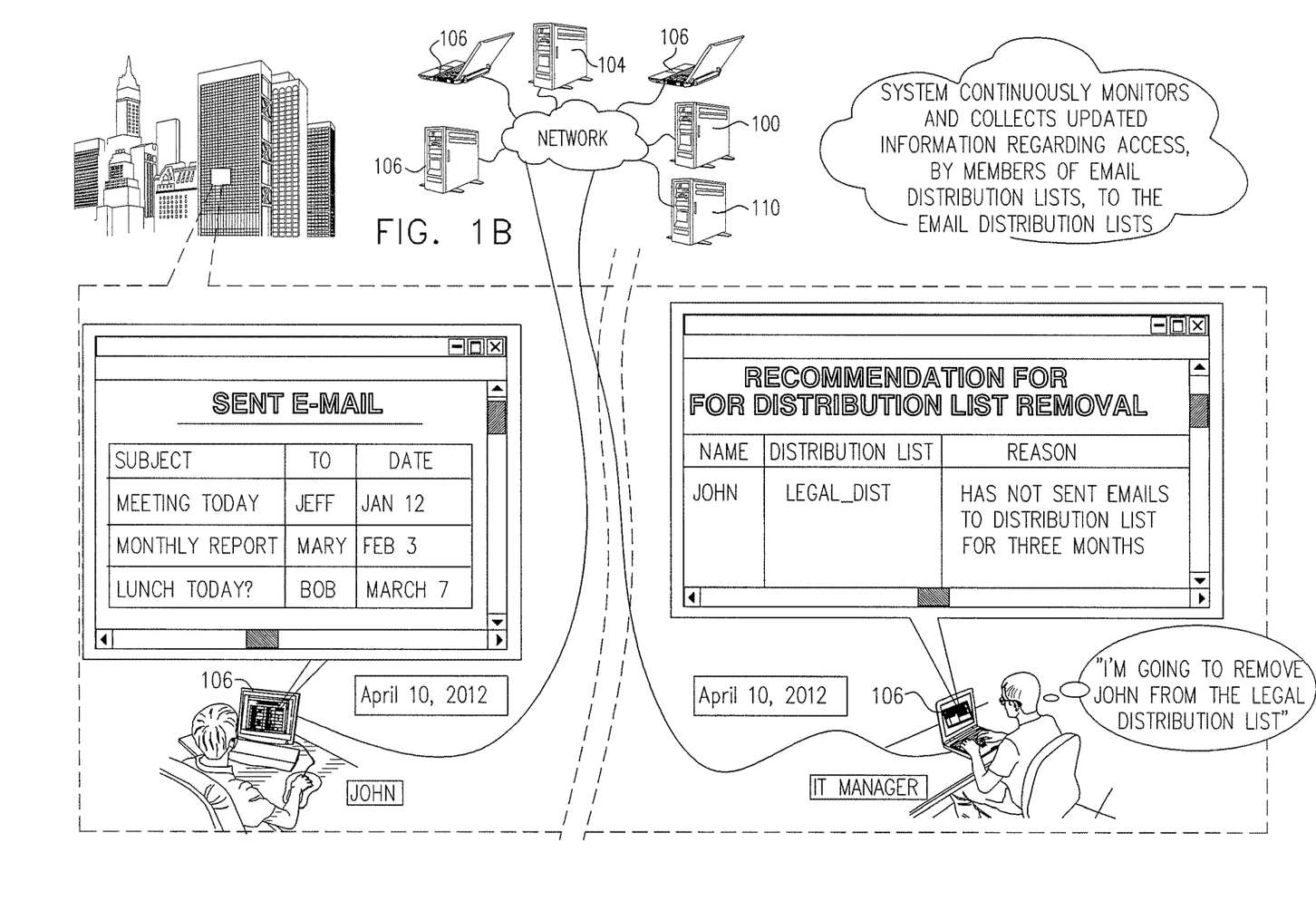

Turning now to FIG. 1B, it is shown that John periodically utilizes email server 110 to send email messages to various employees of the company. On a particular date, such as Apr. 10, 2012, it is shown that John has not sent emails to the legal department distribution list for at least the last three months.

As further shown in FIG. 1B, the IT Manager, utilizing the system of server 100, receives a recommendation from server 100 stating that John has not sent emails to the legal distribution list for at least the last three months, and that therefore, due to John's lack of access to the distribution list, John's membership to the legal distribution list should be revoked. It is appreciated that refraining from sending emails to a distribution list by a member of the distribution list is characteristic of a member for whom membership to the distribution list is no longer necessary.

Alternatively, the system of server 100 may automatically revoke John's membership to the legal distribution list.

Figure 1C:
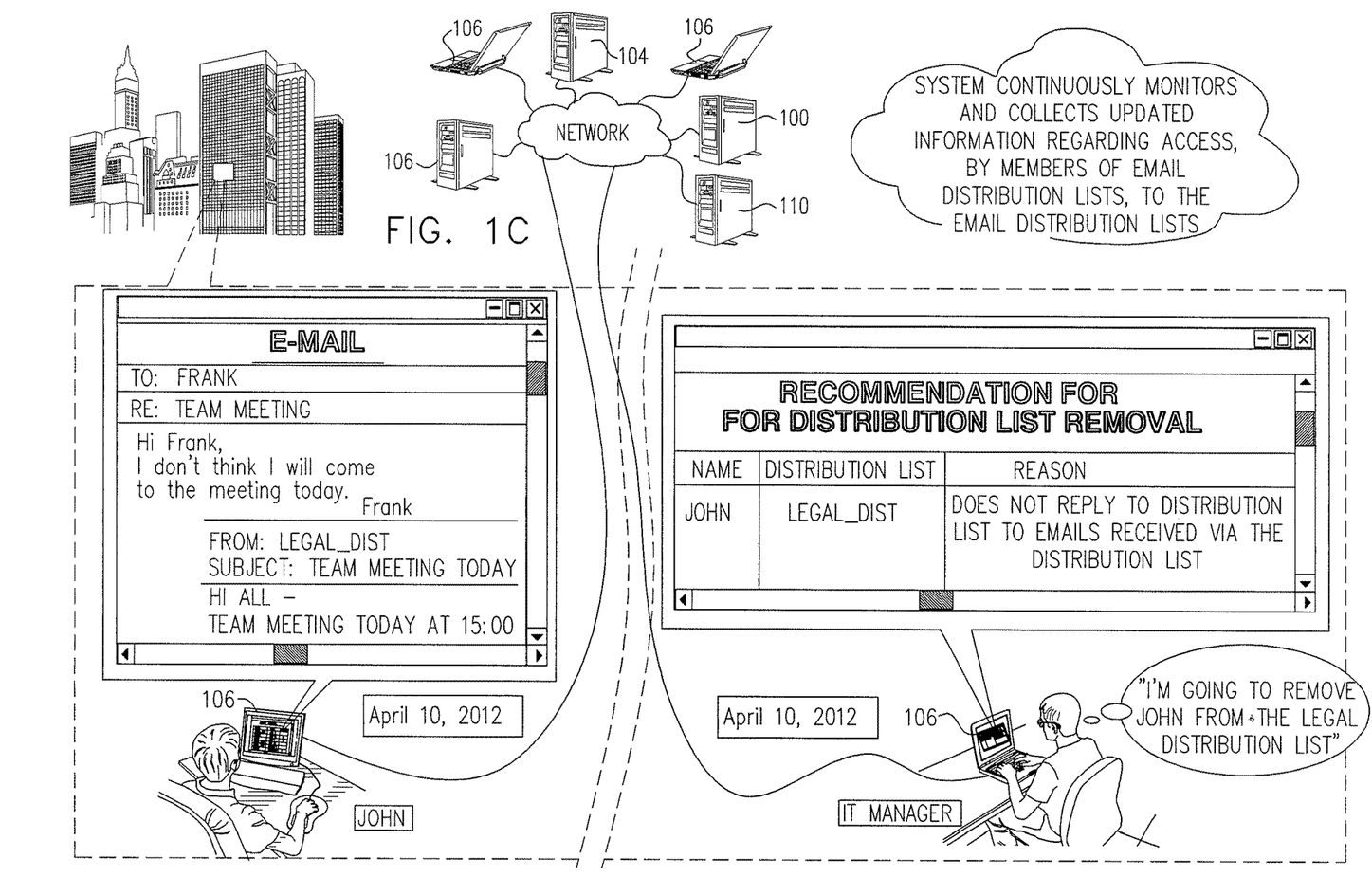

Turning now to FIG. 1C, it is shown that John utilizes email server 110 to reply to an email message he received via the legal department distribution list, however he chooses to reply only to Frank, who is a particular member of the legal department distribution list.

As further shown in FIG. 1C, the IT Manager, utilizing the system of server 100, receives a recommendation from server 100 stating that John, on a regular basis, does not reply to the legal department distribution list when receiving emails via the legal department distribution list, and that therefore, due to John's lack of access to the distribution list, John's membership to the legal distribution list should be revoked. It is appreciated that refraining to reply to a distribution list by a member of the distribution list is characteristic of a member for whom the content distributed on the distribution list is no longer relevant.

Alternatively, the system of server 100 may automatically revoke John's membership to the legal distribution list.

Figure 1D:
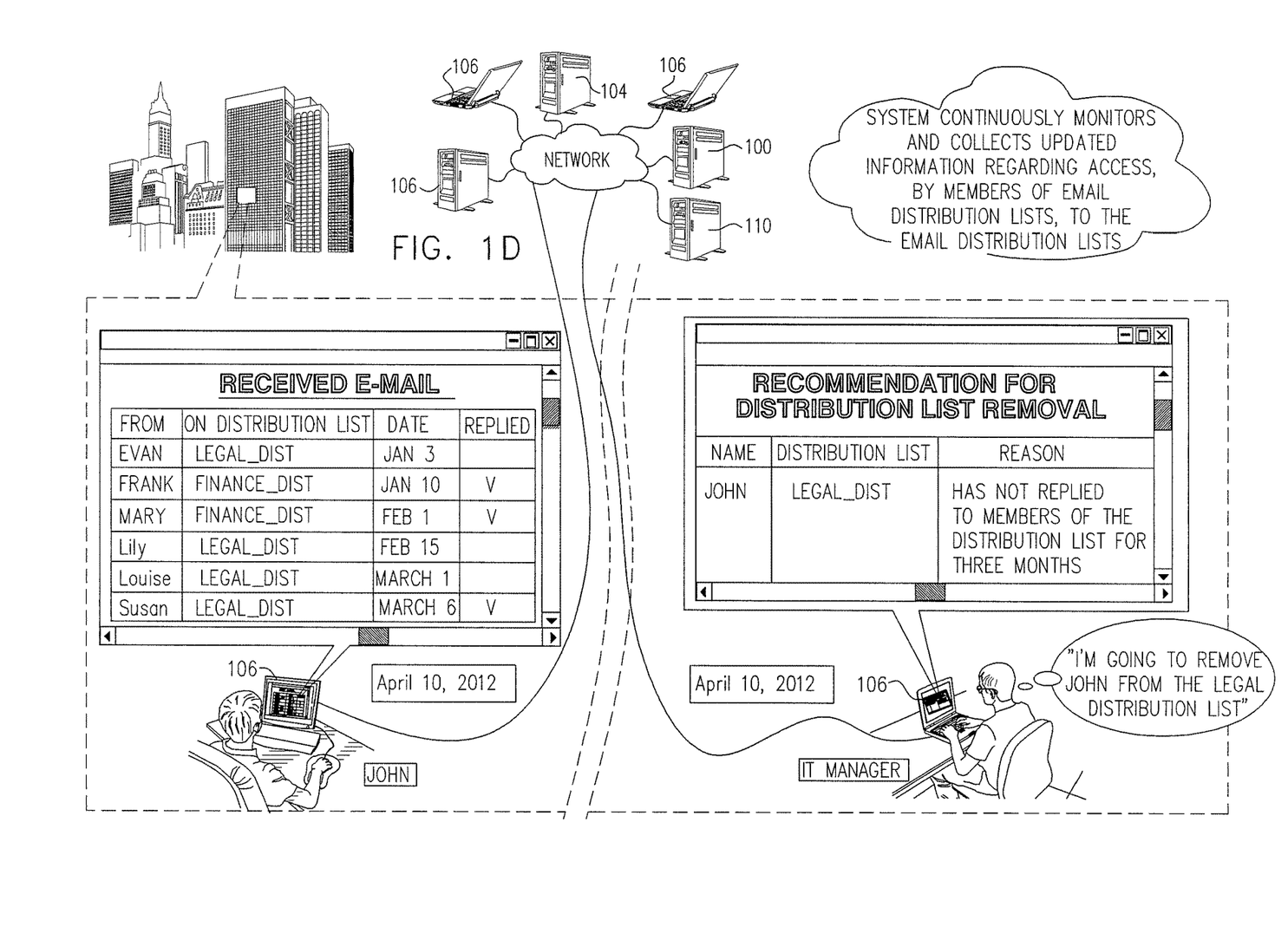

Turning now to FIG. 1D, it is shown that John periodically receives emails from members of the legal department distribution list. On a particular date, such as Apr. 10, 2012, it is shown that John has not replied to emails received from members of the legal department distribution list for at least the last three months.

As further shown in FIG. 1D, an IT Manager utilizing the system of server 100, receives a recommendation from server 100 stating that John has not replied to emails received from members of the legal department distribution list for at least the last three months, and that therefore, due to John's lack of access to the distribution list, John's membership to the legal distribution list should be revoked. It is appreciated that refraining to reply to members of a distribution list by a member of the distribution list is characteristic of a member for whom the content distributed on the distribution list is no longer relevant.

Alternatively, the system of server 100 may automatically revoke John's membership to the legal distribution list.

Figure 1E:
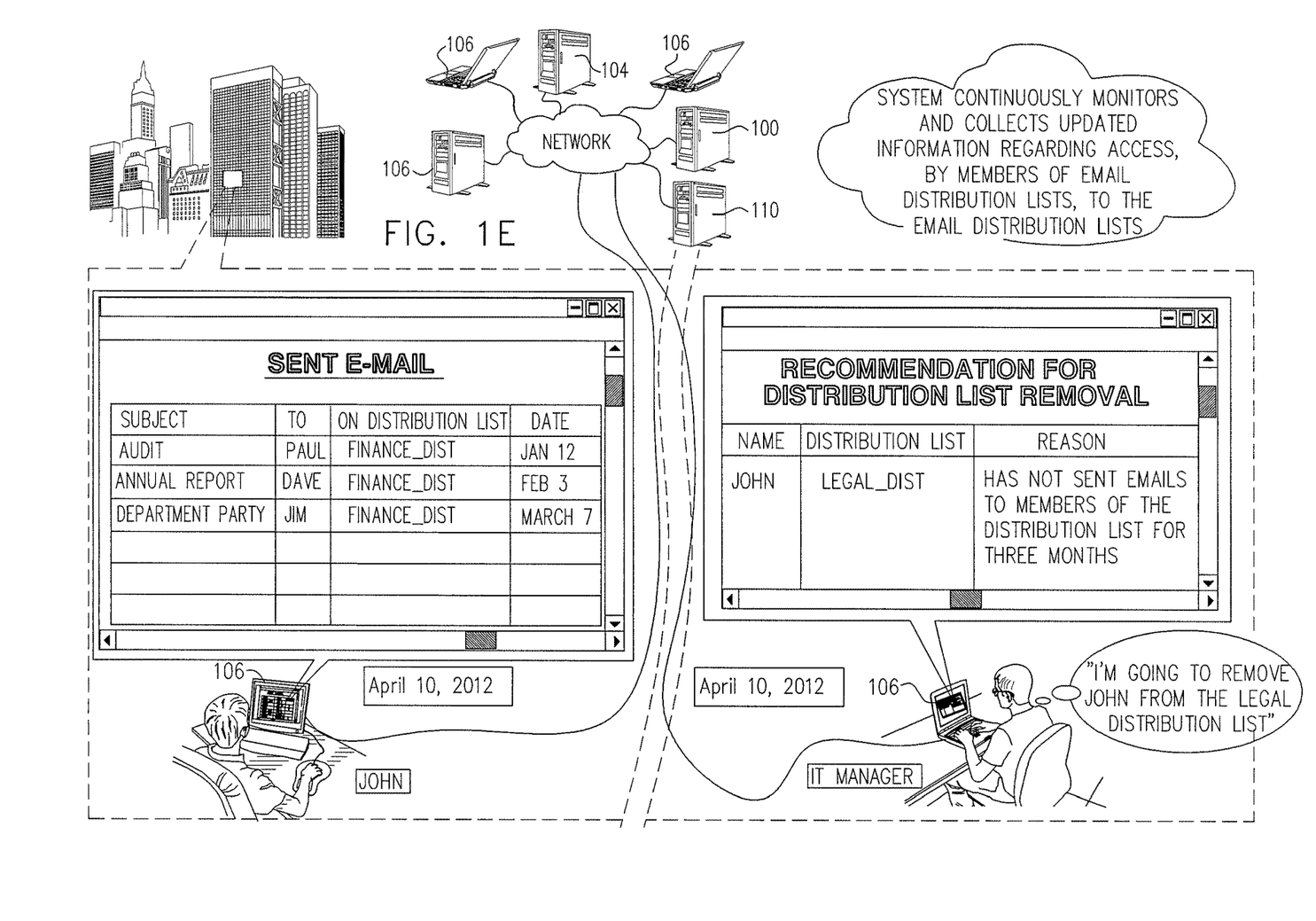

Turning now to FIG. 1E, it is shown that John periodically utilizes email server 110 to send email messages to various employees of the company. On a particular date, such as Apr. 10, 2012, it is shown that John has sent various emails to members of a distribution list associated with the finance department of the company during the last three months, but not to members of the legal department distribution list.

As further shown in FIG. 1E, the IT Manager, utilizing the system of server 100, receives a recommendation from server 100 stating that John has not sent emails to the legal distribution list for at least the last three months, and that therefore, due to John's lack of access to the distribution list, John's membership to the legal distribution list should be revoked. It is appreciated that refraining from sending emails to a distribution list by a member of the distribution list is characteristic of a member for whom membership to the distribution list is no longer necessary.

Alternatively, the system of server 100 may automatically revoke John's membership to the legal distribution list.

Figure 2A:
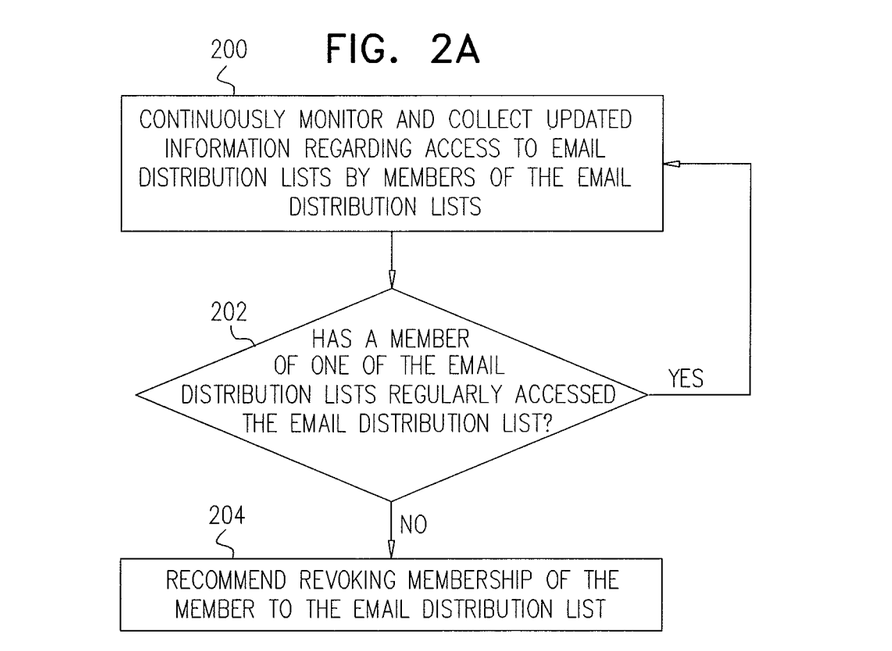
FIGS. 2A and 2B are simplified block diagram illustrations of steps in the operation of the method of FIGS. 1A-1E.
Figure 2B:
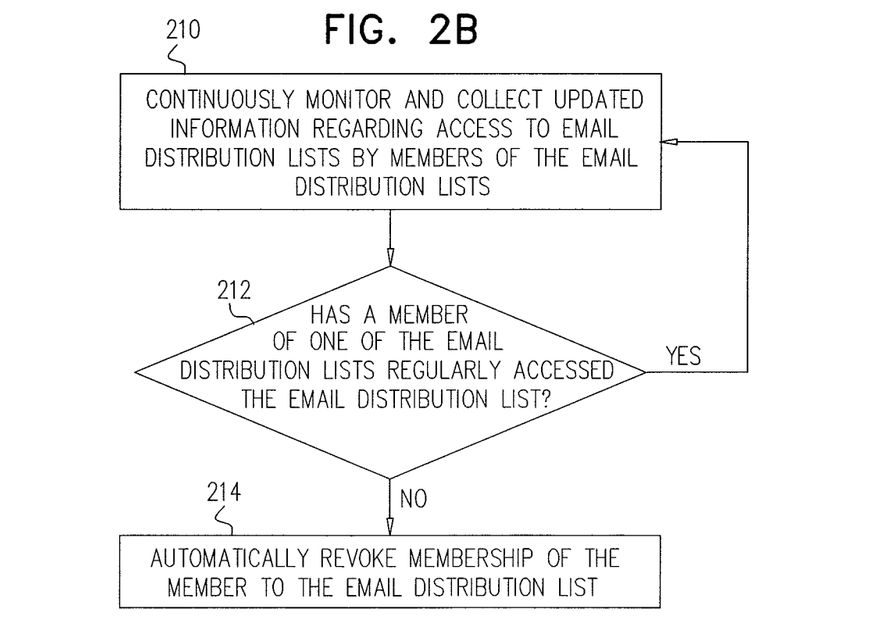

Reference is now made to FIGS. 2A and 2B, which are simplified block diagram illustrations of steps in the operation of the method of FIGS. 1A-1E.

As shown in FIG. 2A, the computer-implemented method for controlling email distribution list membership in an enterprise email system of FIGS. 1A-1E, includes continuously monitoring and collecting updated information regarding access to email distribution lists by members of the email distribution lists (200).

Upon ascertaining that a particular member of one of the email distribution lists has not accessed the email distribution list for a predetermined period of time (202), the method includes recommending revoking membership of the particular member to the email distribution list (204).

Alternatively, as shown in FIG. 2B, the computer-implemented method for controlling email distribution list membership in an enterprise email system of FIGS. 1A-1E, includes continuously monitoring and collecting updated information regarding access to email distribution lists by members of the email distribution lists (210).

Upon ascertaining that a particular member of one of the email distribution lists has not accessed the email distribution list for a predetermined period of time (212), the method includes automatically revoking membership of the particular member to the email distribution list (214).

Figure 3A:
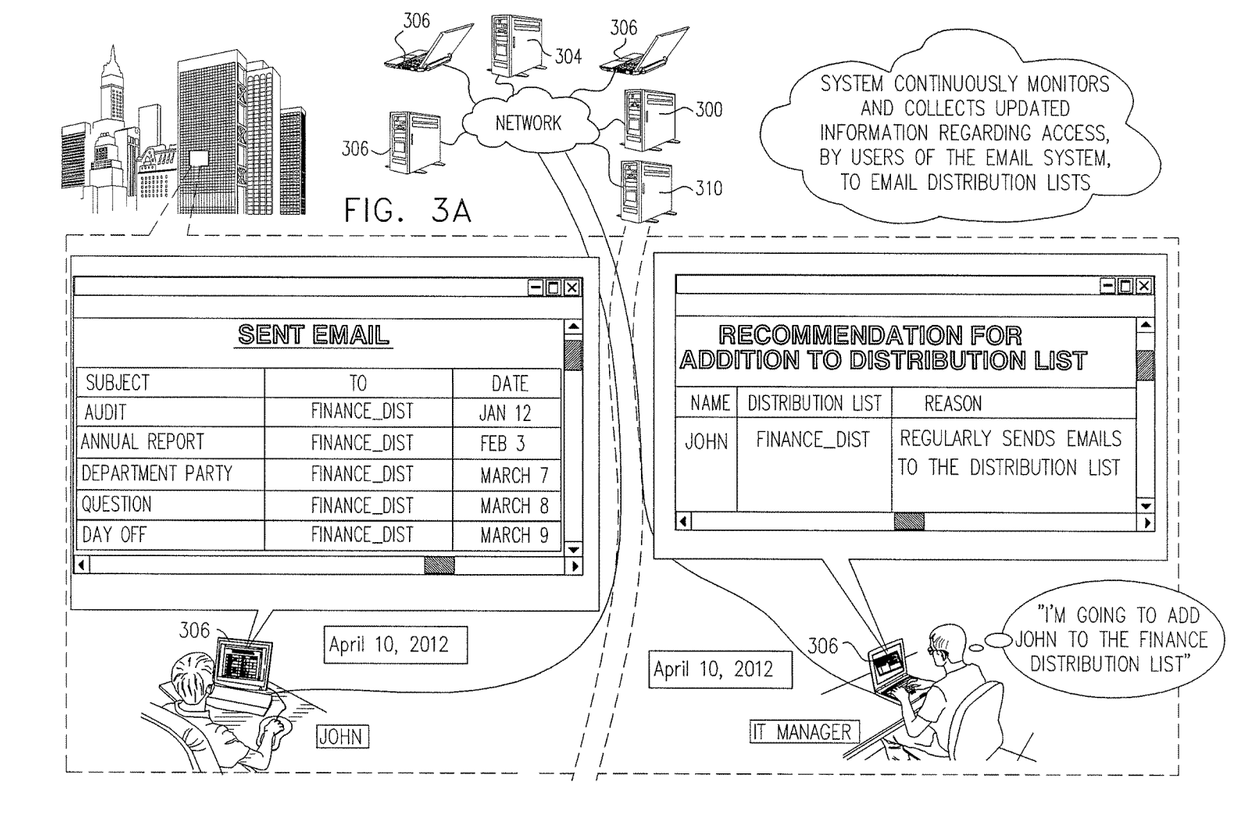
FIGS. 3A, 3B and 3C are simplified pictorial illustrations of an example of steps in the operation of a computer-implemented method for controlling email distribution list membership in an enterprise email system, operative in accordance with another preferred embodiment of the present invention.
Figure 3B:
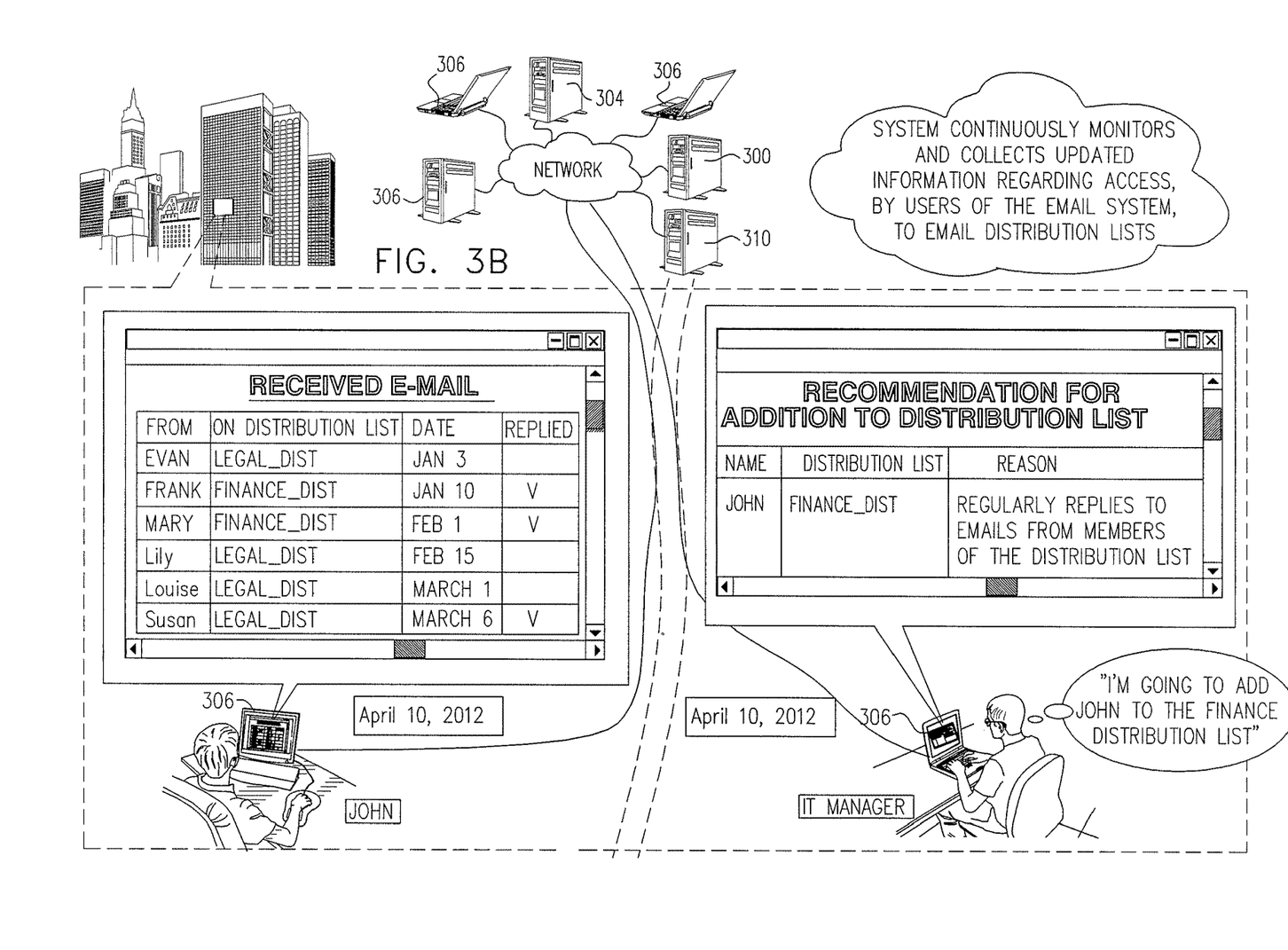
Figure 3C:
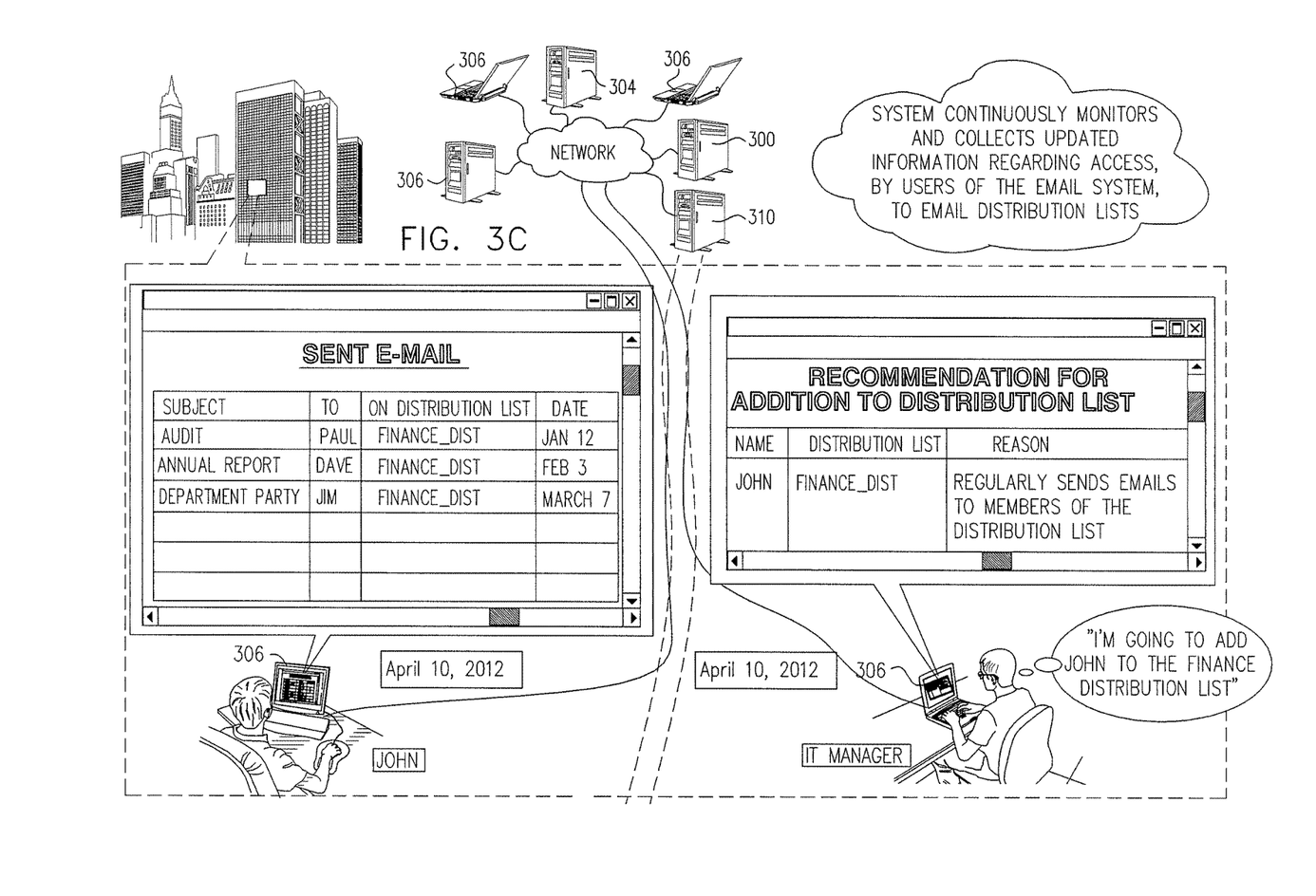

Reference is now made to FIGS. 3A, 3B and 3C, which are simplified pictorial illustrations of an example of steps in the operation of a computer-implemented method for controlling membership to email distribution lists in an enterprise email system, constructed and operative in accordance with another preferred embodiment of the present invention. The method illustrated in FIGS. 3A-3C preferably includes monitoring and collecting continuously updated information regarding access, by users of the email system, to the email distribution lists.

Preferably, the method also includes ascertaining that a particular user of the email system has regularly accessed at least one of the email distribution lists during a predetermined period of time, and at least one of recommending granting membership to the particular user to the email distribution list and automatically granting membership to the particular user to the email distribution list.

The method illustrated in FIGS. 3A-3C is preferably implemented by a system which resides on a server 300 connected to an enterprise-wide computer network 302 having disparate servers 304 and computer 306 connected thereto. Network 302 preferably also comprises at least one email server 310. The system of server 300 preferably continuously monitors and collects updated information regarding access, by users of an email system hosted on email server 310, to the email distribution lists.

Turning now to FIG. 3A, it is shown that John periodically utilizes email server 310 to send email messages to various employees of a company served by email server 310. On a particular date, such as Apr. 10, 2012, it is shown that John has frequently sent emails to the finance department distribution list during the last three months.

As further shown in FIG. 3A, the IT Manager, utilizing the system of server 300, receives a recommendation from server 300 stating that John has frequently sent emails to the finance distribution list during the last three months, and that therefore, due to John's frequent access to the distribution list, John should be granted membership to the finance distribution list. It is appreciated that sending emails to a distribution list by a user is characteristic of a user for whom membership to the distribution list may be necessary.

Alternatively, the system of server 300 may automatically grant John membership to the finance distribution list.

Turning now to FIG. 3B, it is shown that John periodically receives emails from members of the finance department distribution list. On a particular date, such as Apr. 10, 2012, it is shown that John has frequently replied to emails received from members of the finance department distribution list during the last three months.

As further shown in FIG. 3B, an IT Manager utilizing the system of server 300, receives a recommendation from server 300 stating that John has frequently replied to emails received from members of the finance department distribution list during the last three months, and that therefore, due to John's frequent access to the distribution list, John should be granted membership to the finance distribution list. It is appreciated that replying to members of a distribution list by a user is characteristic of a user for whom membership to the distribution list may be necessary.

Alternatively, the system of server 300 may automatically grant John membership to the finance distribution list.

Turning now to FIG. 3C, it is shown that John periodically utilizes email server 310 to send email messages to various employees of the company. On a particular date, such as Apr. 10, 2012, it is shown that John has sent various emails to members of the finance department distribution list during the last three months.

As further shown in FIG. 3C, the IT Manager, utilizing the system of server 300, receives a recommendation from server 300 stating that John has frequently sent emails to members of the finance distribution list during least the last three months, and that therefore, due to John's frequent access to the distribution list, John should be granted membership to the finance distribution list. It is appreciated that sending emails to members of a distribution list by a user is characteristic of a user for whom membership to the distribution list may be necessary.

Alternatively, the system of server 300 may automatically grant John membership to the finance distribution list.

Figure 4A:
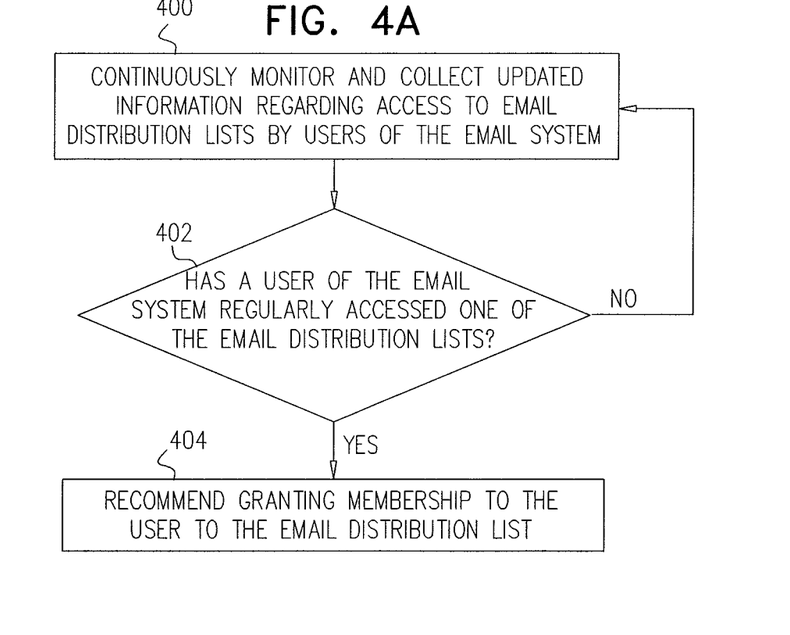
FIGS. 4A and 4B are simplified block diagram illustrations of steps in the operation of the method of FIGS. 3A-3C.
Figure 4B:
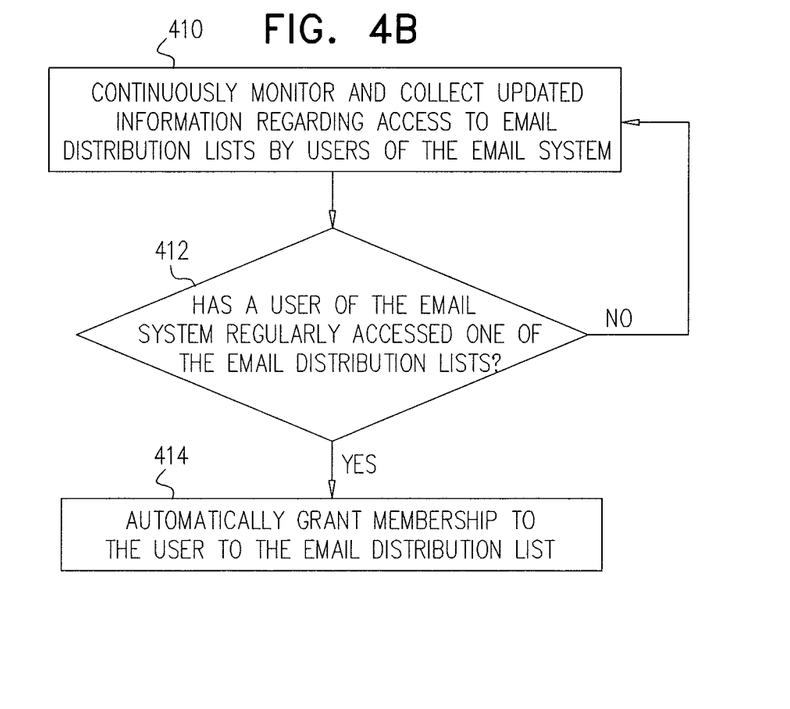

Reference is now made to FIGS. 4A and 4B, which are simplified block diagram illustrations of steps in the operation of the method of FIGS. 3A-3C.

As shown in FIG. 4A, the computer-implemented method for controlling email distribution list membership in an enterprise email system of FIGS. 3A-3C, includes continuously monitoring and collecting updated information regarding access to email distribution lists by users of the email system (400).

Upon ascertaining that a particular user of the email system has regularly accessed at least one of the email distribution lists during a predetermined period of time (402), the method includes recommending granting membership to the particular user to the email distribution list (404).

Alternatively, as shown in FIG. 4B, the computer-implemented method for controlling membership to email distribution lists in an enterprise email system of FIGS. 3A-3C, includes continuously monitoring and collecting updated information regarding access to email distribution lists by users of the email system (410).

Upon ascertaining that a particular user of the email system has regularly accessed at least one of the email distribution lists during a predetermined period of time (412), the method includes automatically granting membership to the particular user to the email distribution list (414).

Figure 5A:
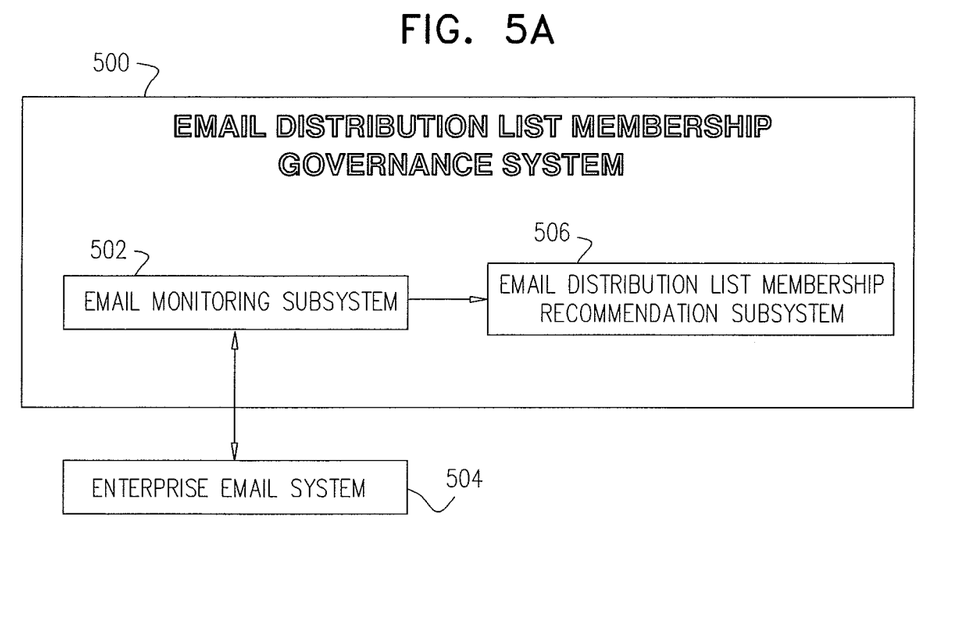
FIGS. 5A and 5B are simplified block diagram illustrations of a system which implements the method of FIGS. 1A-4B.
Figure 5B:
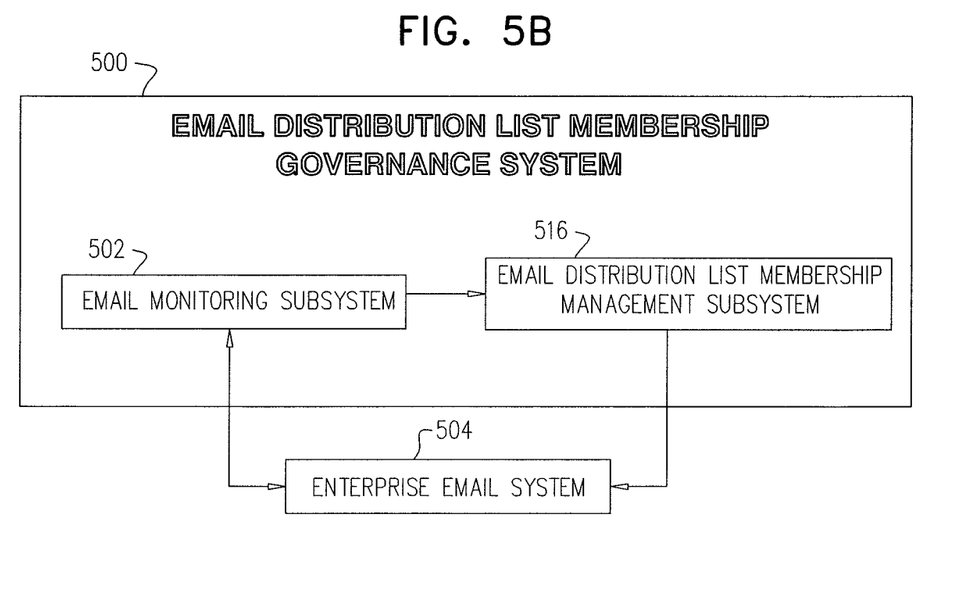

Reference is now made to FIGS. 5A and 5B, which are simplified block diagram illustrations of a system which implements the method of FIGS. 1A-4B. As shown in FIGS. 5A & 5B, the email distribution list membership governance system 500 preferably includes an email monitoring subsystem 502 which communicates with an enterprise email system 504 and continuously monitors and collects updated information regarding access, by users of the email system, to email distribution lists.

As shown in particular in FIG. 5A, email monitoring subsystem 502 also preferably communicates with an email distribution list membership recommendation subsystem 506, which is operative, responsive to information received from email monitoring subsystem 502, to recommend granting or revoking membership of a user to an email distribution list.

Alternatively, as shown in FIG. 5B, email monitoring subsystem 502 communicates with an email distribution list membership management subsystem 516 which is operative, responsive to information received from email monitoring subsystem 502, to automatically grant or revoke membership of a user to an email distribution list on email server 504.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A computer-implemented method comprising:
monitoring and collecting continuously updated information regarding access to enterprise email distribution lists hosted on an enterprise email server by members of said enterprise email distribution lists, said access to an enterprise email distribution list comprising at least email correspondence of a first member of said enterprise email distribution list with at least a second member of said enterprise email distribution list;

ascertaining that a particular member of at least one of said enterprise email distribution lists has not corresponded with any other member of said at least one of said enterprise email distribution lists via email for a predetermined period of time; and responsive to said ascertaining, controlling membership of said at least one of said enterprise email distribution lists by automatically revoking membership of said particular member to said at least one of said enterprise email distribution lists by modifying said at least one of said enterprise email distribution lists, said modifying said at least one of said enterprise email distribution lists comprising removing said particular member from said enterprise email distribution list.

2. A computer-implemented method according to claim 1 and wherein said access to enterprise email distribution lists comprises replying to an email received via said at least one of said enterprise email distribution lists, to said at least one of said enterprise email distribution lists.

3. A computer-implemented method according to claim 1 and wherein said access to enterprise email distribution lists comprises sending an email to said at least one of said enterprise email distribution lists.

4. A computer-implemented method according to claim 1 and wherein said access to enterprise email distribution lists comprises replying to an email received via said at least one of said enterprise email distribution lists, to at least one member of said at least one of said enterprise email distribution lists.

5. A computer-implemented method according to claim 1 and wherein said access to enterprise email distribution lists comprises replying to an email received from at least one member of said at least one of said enterprise email distribution lists, to said at least one member.

6. A computer-implemented method according to claim 1 and wherein said access to enterprise email distribution lists comprises sending an email to at least one member of said at least one of said enterprise email distribution lists.

7. A computer-implemented method comprising:

monitoring and collecting continuously updated information regarding access to enterprise email distribution lists hosted on an email server by users of an email system hosted on said email server, said access to an enterprise email distribution list comprising at least email correspondence of a user of said email system with at least one member of said enterprise email distribution list;

ascertaining that a particular user of said email system has regularly corresponded with at least one other member of at least one of said enterprise email distribution lists via email during a predetermined period of time; and responsive to said ascertaining, controlling membership of said at least one of said enterprise email distribution lists by automatically granting membership to said particular user to said at least one of said enterprise email distribution lists by modifying said at least one of said enterprise email distribution lists, said modifying said at least one of said enterprise email distribution lists comprising adding said particular user to said enterprise email distribution list.

8. A computer-implemented method according to claim 7 and wherein said access to enterprise email distribution lists comprises sending an email to said at least one of said enterprise email distribution lists.

9. A computer-implemented method according to claim 7 and wherein said access to enterprise email distribution lists comprises replying to an email received via said at least one of said enterprise email distribution lists, to at least one member of said at least one of said enterprise email distribution lists.

10. A computer-implemented method according to claim 7 and wherein said access to enterprise email distribution lists comprises sending an email to at least one member of said at least one of said enterprise email distribution lists.

11. An enterprise email distribution list membership governance system comprising a non-transitory, tangible computer-readable medium in which computer program instructions are stored, which instructions, when read by a computer, cause the computer to control enterprise email distribution list membership, said system comprising:

an email monitoring subsystem operable for monitoring and collecting continuously updated information regarding access to enterprise email distribution lists hosted on an email server by members of said enterprise email distribution lists, said access to an enterprise email distribution list comprising at least email correspondence of a first member of said enterprise email distribution list with at least a second member of said enterprise email distribution list; and an enterprise email distribution list membership management subsystem operable for ascertaining that a particular member of at least one of said enterprise email distribution lists has not corresponded with any other member of said at least one of said enterprise email distribution lists via email for a predetermined period of time, and, responsive to said ascertaining, for controlling membership of said at least one of said enterprise email distribution lists by automatically revoking membership of said particular member to said at least one of said enterprise email distribution lists by modifying said at least one of said enterprise email distribution lists said modifying said at least one of said enterprise email distribution lists comprising removing said particular member from said enterprise email distribution list.

12. An enterprise email distribution list membership governance system according to claim 11 and wherein said access to enterprise email distribution lists comprises replying to an email received from said at least one of said enterprise email distribution lists, to said at least one of said enterprise email distribution lists.

13. An enterprise email distribution list membership governance system according to claim 11 and wherein said access to enterprise email distribution lists comprises sending an email to said at least one of said enterprise email distribution lists.

14. An enterprise email distribution list membership governance system according to claim 11 and wherein said access to enterprise email distribution lists comprises replying to an email received from said at least one of said enterprise email distribution lists, to at least one member of said at least one of said enterprise email distribution lists.

15. An enterprise email distribution list membership governance system according to claim 11 and wherein said access to enterprise email distribution lists comprises replying to an email received from at least one member of said at least one of said enterprise email distribution lists, to said at least one member.

16. An enterprise email distribution list membership governance system according to claim 11 and wherein said access to enterprise email distribution lists comprises sending an email to at least one member of said at least one of said enterprise email distribution lists.

17. An enterprise email distribution list membership governance system comprising a non-transitory, tangible computer-readable medium in which computer program instructions are stored, which instructions, when read by a computer, cause the computer to control enterprise email distribution list membership, said system comprising:

an email monitoring subsystem operable for monitoring and collecting continuously updated information regarding access to enterprise email distribution lists hosted on an email server, by users of an email system hosted on said email server, said access to an enterprise email distribution list comprising at least email correspondence of a first member of said enterprise email distribution list with at least a second member of said enterprise email distribution list; and an enterprise email distribution list membership management subsystem operable for ascertaining that a particular user of said email system has regularly corresponded with at least one other member of at least one of said enterprise email distribution lists via email during a predetermined period of time and, responsive to said ascertaining, for controlling membership of said at least one of said enterprise email distribution lists by automatically granting membership to said particular user to said at least one of said enterprise email distribution lists by modifying said at least one of said enterprise email distribution lists, said modifying said at least one of said enterprise email distribution lists comprising adding said particular user to said enterprise email distribution list.

18. An enterprise email distribution list membership governance system according to claim 17 and wherein said access to enterprise email distribution lists comprises sending an email to said at least one of said enterprise email distribution lists.

19. An enterprise email distribution list membership governance system according to claim 17 and wherein said access to enterprise email distribution lists comprises replying to an email received from said at least one of said enterprise email distribution lists, to at least one member of said at least one of said enterprise email distribution lists.

20. An enterprise email distribution list membership governance system according to claim 17 and wherein said access to enterprise email distribution lists comprises sending an email to at least one member of said at least one of said enterprise email distribution lists.

* * * * *